United States Patent

Wada et al.

[11] Patent Number: 6,004,487
[45] Date of Patent: Dec. 21, 1999

[54] METHOD AND APPARATUS FOR LASER-TEXTURING DISK SURFACES

[75] Inventors: Kenya Wada, Ninomiya-machi; Hisayoshi Ichikawa, Minami Ashigara; Kazuto Kinoshita, Tsukuba; Shinji Sugizaki, Odawara, all of Japan

[73] Assignee: Hitachi Electronics Engineering Co., Ltd., Tokyo, Japan

[21] Appl. No.: 09/111,376

[22] Filed: Jul. 7, 1998

[30] Foreign Application Priority Data

Jul. 7, 1997 [JP] Japan ................................ 9-195200

[51] Int. Cl.[6] .................................................. B29D 11/00
[52] U.S. Cl. .................................. 264/1.33; 219/121.75; 219/121.77; 264/1.37; 264/400; 425/174.4
[58] Field of Search .................... 219/121.67, 121.75, 219/121.77, 121.78; 264/1.33, 1.37, 400, 482; 425/174.4

[56] References Cited

U.S. PATENT DOCUMENTS

| | | | |
|---|---|---|---|
| 4,275,288 | 6/1981 | Makosch et al. | 219/121.75 |
| 4,315,130 | 2/1982 | Inagaki et al. | 219/121.78 |
| 4,623,776 | 11/1986 | Buchroeder et al. | 219/121.67 |
| 4,642,439 | 2/1987 | Miller et al. | 264/1.37 |
| 5,062,021 | 10/1991 | Ranjan et al. . | |
| 5,279,775 | 1/1994 | Thomas et al. | 264/1.33 |
| 5,378,582 | 1/1995 | Chan | 219/121.77 |
| 5,498,508 | 3/1996 | Chan | 219/121.77 |
| 5,676,866 | 10/1997 | in den Baumen et al. | 219/121.77 |
| 5,768,076 | 6/1998 | Baumgart et al. . | |
| 5,822,211 | 10/1998 | Barenboim et al. | 219/121.77 |
| 5,863,473 | 1/1999 | Ohsawa et al. | 264/1.37 |

*Primary Examiner*—Mathieu D. Vargot
*Attorney, Agent, or Firm*—Oblon, Spivak, McClelland, Maier & Neustadt, P.C.

[57] ABSTRACT

Method and apparatus for a disk texturing operation in which laser pulses are successively bombarded against a delimited surface area on the face of a rotating disk, from an optical laser pulse irradiating means which is put in movement in a radial direction relative to the disk to provide a textured zone of a predetermined width on the disk. A pulsed laser beam from a laser light source is adjusted to an optimum power level for an aimed bump diameter. The laser beam is then transformed into an annular beam of a collimated light flux having specified inner and outer diameters, and the resulting laser pulses are successively bombarded on the texturing zone through an objective optical system condensing said laser pulses into a specified spot diameter thereby to form minute bumps of predetermined shape and diameter uniformly on the surface of the disk.

15 Claims, 8 Drawing Sheets

METHOD AND APPARATUS FOR LASER-TEXTURING DISK SURFACES

FIELD OF THE ART

This invention relates to a method and an apparatus for laser-texturing delimited surface areas of disks, and more particularly to a method and an apparatus for texturing a surface area of magnetic recording disk substrates of glass or the like to provide thereon an annular textured zone of a predetermined width and of such a nature as to contribute to improvements of floatation or fling characteristics of magnetic heads.

Prior Art

Magnetic recording disk drives, which are in wide use with or on computers as external storage means, are generally arranged to mount a magnetic recording disk (hereinafter referred to simply as "disk" for brevity) on a spindle which serves as a rotational drive for the disk. The magnetic disk face or faces which are coated with a magnetic recording film are accessed by a magnetic head for data write-in and read-out operations. Namely, in a data write-in or read-out operation, a magnetic head is moved radially along a face of a rotating magnetic disk on the spindle in non-contacting relation with the disk. Upon stopping the magnetic disk, the magnetic head is moved to a position outside data storage areas to rest on a predetermined zone on the face of the disk. Conversely, when the magnetic disk drive is actuated to start rotation of the disk, the magnetic head which has been at rest is floated up by air streams which occur on the disk surface. As the rotation of the disk reaches a rated speed, the magnetic head is floated on a laminar air stream to fly over the disk surface, maintaining a predetermined gap space from the latter. The disk drives which starts and stops a magnetic head in this manner are generally referred to as a CSS (contact start-stop) type.

In the case of a magnetic disk drive of the CSS type, in addition to data storage areas, each magnetic recording disk is provided with a CSS zone on its surface on which the magnetic head touches down and rests when the disk is not in operation. Normally, the CSS zone is formed in an annular shape radially on the inner side of a data storage zone. Thus, the CSS type disk drives inevitably involve CSS motions of a magnetic head, i.e., motions of a magnetic head flying up from a CSS zone at the start of disk rotation and touching down on the CSS zone upon stopping the disk rotation. In order to ensure smooth CSS motions, it is necessary for the magnetic head to be able to float up smoothly and quickly without sticking on the disk surface and to touch down on a disk surface with a least amount of frictions until the disk stops its rotation.

For the purpose of improving the CSS motions, it is the usual practice to texture the CSS zone on the disk face with minute bumps and to apply a lubricative agent thereon. Thus, the CSS zone on the disk face has a non-smooth surface in contrast to data storage areas which have a flat smooth surface free of surface irregularities in order to stabilize the posture of the magnetic head as soon as it is floated up and transferred onto a data storage area. In this connection, especially from the standpoint of high density data recording, it is usually required to lift up the magnetic head in such a manner as to face the disk surface through an infinitesimally small gap. Therefore, the surfaces of data storage areas of the disk have to be smoothed to an extremely high precision level, in contrast to the CSS zone with extremely minute bumps formed uniformly all over its surface. Besides, the CSS zone has to be formed strictly in a predetermined width because, if formed in a larger width, it will invade a data storage area and reduce the memory capacity of the disk.

The CSS zone on each magnetic recording disk is textured with minute bumps by a surface texturing operation. Although even the data storage areas of disks require a texturing operation, especially the CSS zone needs the so-called zone-texturing operation which is limited to a particular zone on the face of the magnetic recording disk. For zone-texturing, for example, it has been the usual practice to abrade a disk surface by the use of abrasive grains in combination with a carrier tape or by the use of a texturing tape which is impregnated with abrasive grains. The CSS zone can also be formed by chemical etching. However, in the mechanical abrasion or chemical etching process just mentioned, difficulties are often encountered in controlling the width of the CSS zone strictly and precisely to a predetermined width and in imparting a high-precision texture to the surface of the CSS zone.

For texturing CSS zones of magnetic recording disks, there have been developed and in use the so-called laser texturing technology, in which the surface of a CSS zone is textured by bombarding laser pulses successively in a predetermined pitch or at predetermined intervals. Upon bombarding laser pulses, surface portions of a CSS zone are heated and melted locally spot by spot by the energy of laser pulses, leaving bumps on the surface of the CSS zone after resolidification. It is a paramount requisite to form bumps uniformly on the CSS zone, that is to say, in uniform density in terms of the number per unit area of the bumps which are formed by the shots of laser pulses.

Laser texturing apparatuses are generally constituted by a laser energy source for generating a laser beam, and an optical system for irradiating or firing laser pulses at a magnetic disk substrate. Through an optical irradiating system, laser pulses from a laser light source are bombarded against a predetermined surface area of a disk substrate in a bump pattern which is determined depending upon the power level of the laser beam and the beam spot diameter at a condensed position. Since a disk substrate is rotated at a constant speed during a texturing operation, the pitch of bumps to be formed on the substrate can be controlled on the basis of the time intervals of laser pulses triggered by the optical irradiating system. At the same time, the width of a texturing zone can be controlled by shifting the laser pulse bombarding position on the disk over a corresponding distance in the radial direction. Further, the density of bumps on the disk surface can be controlled by varying laser pulse irradiation periods in relation with the rotational speed of the disk and the speed of radial displacement of the laser pulse bombarding position. It follows that a texturing operation of extremely high accuracy becomes possible by strictly controlling these factors.

Regarding the materials which are employed for magnetic recording disk substrates, in addition to conventional metal plates of aluminum or the like, substrates of electrically insulating inorganic material like glass have been developed and put in use in recent years. Glass material for disk substrates is usually transparent or semi-transparent and relatively fragile. Therefore, depending upon the wavelength of the laser beam, the laser texturing becomes difficult because fired laser pulses could be simply transmitted through the substrate material which is unable to absorb the laser energy.

In this connection, Japanese Laid-Open Patent Application H4-311814 discloses a laser texturing system for glass substrates. According to this texturing system, a back plate is located on the back side of a disk substrate at a predetermined distance from the latter and in such a position as to confront a laser beam bombarding means through the disk substrate. A vertically projected laser beam is allowed to pass through the substrate and bombarded against the back plate. By the energy of the bombarded laser beam, fine molten particles are scattered from the back plate and caused to collide against the surface of the disk substrate which faces the back plate. As a result, the surface of the disk substrate is deformed and coarsened by colliding particles which impart a bumpy texture to the disk surface.

According to the prior art texturing system just mentioned, however, it is difficult to control the scattering directions of fine particles which are released from the back plate. In other words, difficulties are encountered not only in forming a strictly defined texture zone but also in imparting a uniform texture because the surface coarseness is varied spontaneously depending upon the colliding angle of scattered particles. Therefore, it is extremely difficult for this prior art system to perform a high-precision texturing operation.

When a light beam of a wavelength of about 5 $\mu$m or longer is projected on a glass substrate from a normal direction, total transmission of incident light does not occur because it is partly reflected off the surface of the substrate and partly absorbed by the glass material. It follows that, in case the laser light source is of a carbon dioxide gas laser ($CO_2$ laser) having a wavelength longer than 5 $\mu$m, more specifically, a wavelength of 10.6 $\mu$m in a far-infrared region, the surface of a glass substrate can be locally melted or softened by absorption of part of the laser beam from the laser light source thereby to form minute bumps, that is to say, to form a textured surface. A surface texturing system using a $CO_2$ gas laser source is proposed in Laid-Open Japanese Patent Application H7-182655, in which laser pulses from a $CO_2$ laser light source are condensed to a spot on a glass surface through a ZnSe condensing lens.

The shape of bumps which are formed by a texturing operation has a great influence on the CSS motions of magnetic head. The bumps should be formed in predetermined diameter and height (generally referred to as "bump diameter" and "bump height"), and particularly the control of the bump diameter has great importance in a CSS zone texturing operation because irregularities in diameter will result in bumps which have different apex curvatures despite uniformity in height. Since a magnetic head touches down and rests on apex portions of bumps, variations in apex curvature of bumps could impair smooth CSS motions of magnetic heads. Therefore, in order to achieve improvements in accuracy in this regard, it is extremely important for a texturing operation to be able to control the diameter of bumps to a desired measure. However, no bump diameter control means is provided in the above-mentioned texturing machine. In the case of a laser energy source employing a $CO_2$ laser with an output wavelength of 10.6 $\mu$m, reductions in bump diameter would only be possible to about 15 to 20 $\mu$m at best even if it is condensed or stopped by the use of an objective optical system. Therefore, the conventional laser texturing machine is inapplicable to texturing operations involving formation of bumps of about 10 $\mu$m or smaller in diameter for ensuring better relations between a disk and a magnetic head.

SUMMARY OF THE INVENTION

In view of the foregoing situations, it is an object of the present invention to realize a high-precision zone texturing operation on a specific surface area of a magnetic recording disk substrate of glass or the like by the use of a laser beam.

It is another object of the present invention to provide laser texturing method and apparatus, which can precisely control the shape of bumps as units of a texture to be imparted to a specified surface of a magnetic recording disk substrate.

It is still another object of the present invention to provide laser texturing method and apparatus, which can strictly control the width of a texture zone to be formed on the surface of a magnetic recording disk substrate.

It is a further object of the present invention to provide laser texturing method and apparatus, which can form bumps of uniform shape on the surface of a magnetic recording disk substrate in an accurately and accelerated manner and strictly in an aimed density.

In accordance with the present invention, there is provided an apparatus for texturing a specific surface area of a rotating magnetic recording disk substrate radially over a predetermined width by irradiation of laser pulses supplied from a laser light source and successively fired at said disk surface through a laser pulse irradiating optical system in movement in a radial direction relative to said disk substrate. The laser-texturing apparatus according to the present invention is characterized in that the laser pulse irradiating optical system includes: an annular aperture beam expander for transforming a laser beam from the laser light source into an annular beam of collimated light flux having specified inner and outer diameters; and an objective optical system for irradiating pulses of said annular laser beam successively in a specified spot diameter in a delimited surface area of a magnetic recording disk substrate to texture said surface area with minute bumps of predetermined diameter and shape.

In the case of texturing a glass substrate, the laser light source employs, for example, a laser device like $CO_2$ laser which would not be transmitted through the glass substrate. The annular aperture beam expander can be constituted by a couple of cone lenses which are located in a predetermined spaced relation in the light path of a laser beam from the light source, i.e., a first cone lens having a flat planar surface on the input side and a conical surface on the output side thereof, and a second cone lens having a conical surface on the input side and a flat planar surface on the output side thereof. Laser pulses to be condensed toward a texturing surface of the disk substrate through the objective optical system can be adjusted into an optimal beam spot diameter by adjusting the positions of the first and second cone lenses toward or away from each other. Although normally a texturing operation is needed only on a delimited surface area of a disk substrate, it is preferable for the objective optical system to be movable in the direction of the optical axis toward and away from the annular beam expander. Especially, from the standpoint of preventing interference between the disk substrate and the laser pulse irradiating optical system and arranging various components of the optical system in a compact form, it is advantageous to employ a reflector mirror to turn the light path of the annular collimated beam from the annular beam expander at right angles toward the objective optical system and to make the objective optical system movable in a radial direction of the disk substrate. The spot diameter at a condensed position of the beam can be controlled by the annular aperture beam expander. In order to control the intensity of the beam, it is preferred to provide a variable light attenuation means between the laser light source and the annular beam expander.

According to the present invention, there is also provided a method for laser-texturing a delimited surface area of a magnetic recording disk substrate by successively bombarding laser pulses thereon through an optical laser pulse irradiating means in movement in a radial direction of the disk substrate to texture that surface area with minute bumps of specified shape and diameter, the method comprising the steps of: adjusting the intensity of a pulsed laser beam from a laser light source to an optimum level for the specified bump diameter and shape; transforming the laser beam into an annular beam of collimated light flux having specified inner and outer diameters; and irradiating resulting laser pulses on the delimited texturing surface area of the disk substrate through an objective optical system condensing the laser pulses to a specified spot diameter thereby to texture the delimited surface area of the disk substrate uniformly with minute bumps of predetermined shape and diameter.

BRIEF DESCRIPTION OF THE DRAWINGS

The above and other objects, features and advantages of the present invention will become apparent from the following particular description of the invention, taken in conjunction with the accompanying drawings which show by way of example some preferred embodiments of the invention and in which:

FIGS. 6(a–c) diagrammatically shows various beam patterns incident on an objective optical system;

FIGS. 7(a–c) diagrammatically shows various beam spot patterns which occur at the focus of the objective optical system as a result of condensation of input laser beams having the patterns as shown in FIG. 6;

DESCRIPTION OF PREFERRED EMBODIMENTS

Figure 1:
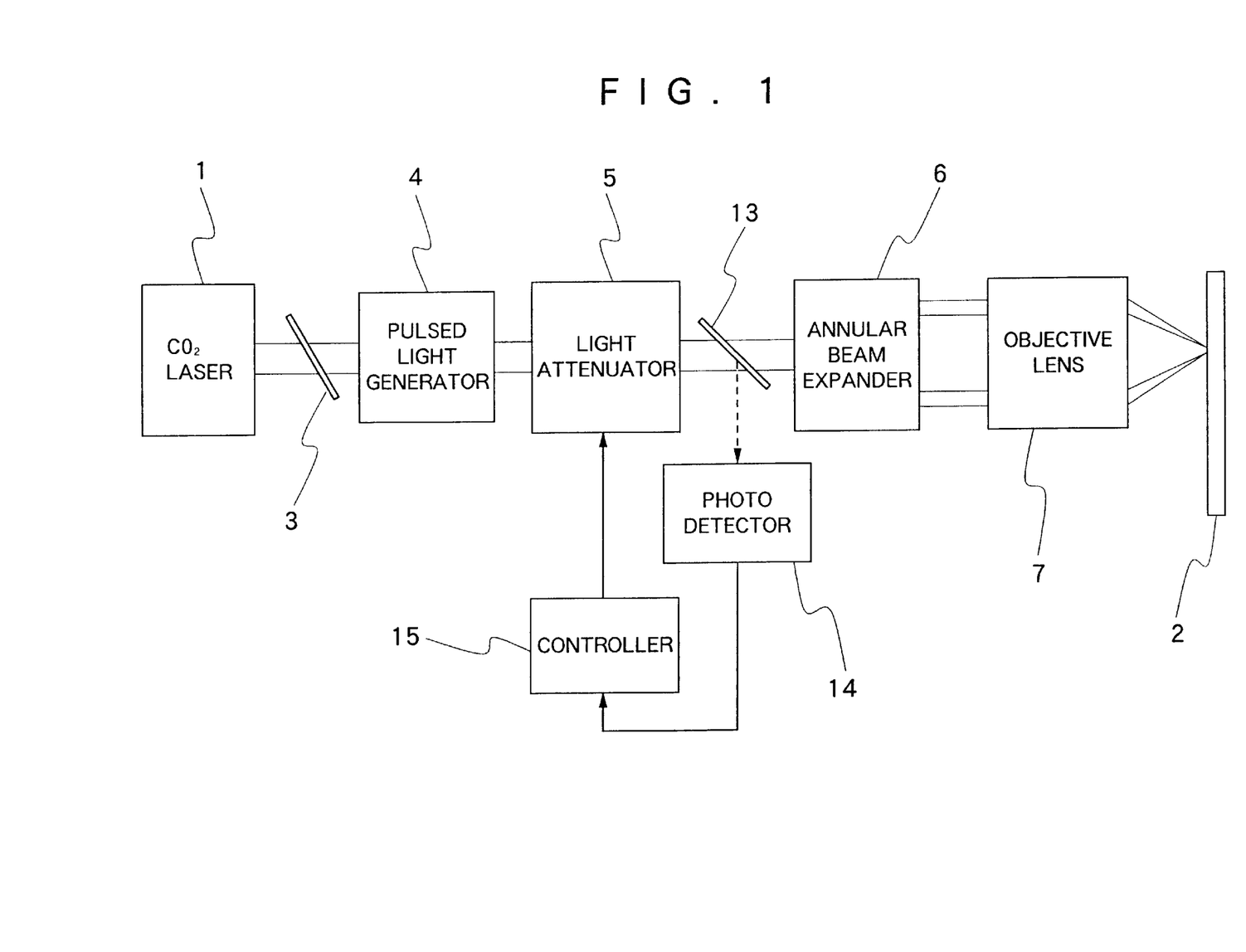
FIG. 1 is a block diagram of an optical laser pulse irradiating system employed in one embodiment of the laser texturing apparatus according to the present invention.

Hereafter, the present invention is described more particularly by way of its preferred embodiment with reference to the accompanying drawings. Shown by way of example in FIG. 1 is an optical system arrangement suitable for use on a laser texturing apparatus according to the invention. Needless to say, the present invention is not restricted to the particular optical arrangement shown in FIG. 1.

In FIG. 1, indicated at 1 is a laser light source and at 2 is a magnetic recording disk substrate to be textured by a laser beam from the laser light source 1. In this instance, the disk substrate 2 is in the form of a thin circular sheet of reinforced glass or the like. The laser light source 1 is constituted by a $CO_2$ laser which, in this particular embodiment, generates a continuous laser beam although it may be arranged as a pulsed beam generating type. This $CO_2$ laser is adapted to generate a laser beam with an output wavelength of 10.6 $\mu$m in the far infrared region. The laser beam from the light source 1 is shot at a disk substrate 2 through an optical laser pulse irradiating system. More particularly, firstly the laser beam is passed through an ND filter 3 for adjustment of laser beam intensity, and the continuous-wave laser beam is modulated into a pulsed beam by a pulsed light generator 4, which is constituted, for example, by a modulator element such as AOM (acousto-optical modulation element) or EOM (electro-optical modulation element). The pulsed light generator 4 can be omitted in case the laser light source 1 is a laser pulsed beam generating type. The ND filter 3 can also be omitted depending upon the output power level of the laser light source 1.

The intensity of laser pulses, which are generated by the pulsed-light generator 4, is adjusted to an optimum level through a light attenuation means 5. Because of fragility of the disk substrate 2 which is made of glass and depending upon the output power level of the laser light source 1, the disk substrate 2 can be broken or fractured when laser pulses from the laser light source 1 are bombarded thereagainst directly without adjustment in intensity. Therefore, the laser pulse power is attenuated to a suitable level which would not damage the glass substrate itself. In addition, it is necessary to control the output power at a constant level since the output laser pulse power has influences on the height of bumps to be formed on the disk substrate 2. Thus, it is desirable to provide the light attenuation means 5 to attenuate the output laser power of the light source 1 to a suitable level.

Figure 2:
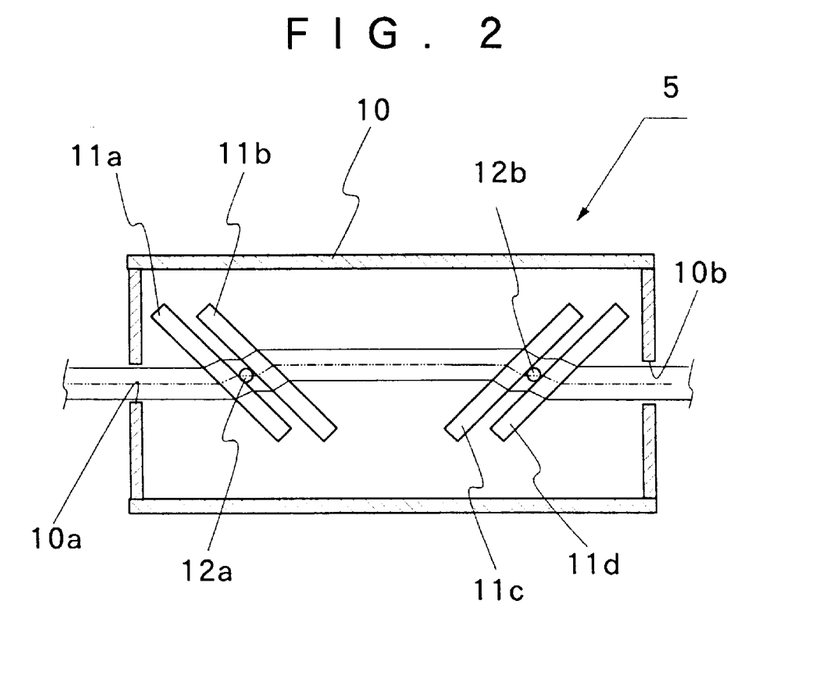
FIG. 2 is a schematic view of a light attenuation means.

Shown in FIG. 2 is one particular form of the light attenuation means 5. Instead of the particular arrangement shown there, if desirable, a modulation element such as AOM or EOM may be used for the light attenuation means 5. In the particular example shown, the light attenuation means 5 is provided with a housing 10 having input and output apertures 10a and 10b in the opposite front and rear end walls. Provided within the housing 10 are a plural number of variable light transmission plates 11a to 11d (generally designated by a reference numeral "11"). For transmitting a wavelength of 10.6 $\mu$m, these variable transmission plates 11 employ a single-crystal plate of germanium (Ge) or a plate of KCl or ZnSe (zinc selenide). Especially, ZnSe is suitably used among the materials just mentioned.

The variable light transmission plates 11 are used in a couple of groups each consisting of one or two variable transmission plates. As the variable transmission plates 11 are inclined relative to the optical axis, part of incident light is reflected off to attenuate the output light power correspondingly to the amounts of light reflections at the respective light incident surfaces. Light reflections off the respective variable transmission plates 11 are absorbed by inner surfaces of the housing 10, which are covered with non-reflective means, for example, with a non-reflective coating or a non-reflective roughened surface.

In the particular example shown in FIG. 2, the light attenuation means 5 employs four variable transmission plates 11 in total, more specifically, four variable transmission plates 11a to 11d which are divided into front and rear groups each consisting of two variable transmission plates 11a and 11b or 11c and 11d. The variable transmission plates 11a and 11b of the front group are located in the light path of the input laser beam with a predetermined spacing therebetween and fixedly supported on a tilting shaft 12a so that they can be turned or inclined simultaneously in the same direction in an interlinked fashion. Similarly, the variable transmission plates 11c and 11d of the rear group are located in the light path in the same spaced relations with each other as the variable transmission plates 11a and 11b of the first group, and fixedly supported on another tilting shaft 12b so that similarly they can be turned or inclined simultaneously in the same direction in an interlinked fashion. The front and rear tilting shafts 12a and 12b are driven synchronously to turn through the same angle but in the opposite directions. The rotational drive for the tilting shafts 12a and 12b may be manual or automatic. Nevertheless, from the standpoint of stabilizing the output power, it is desirable to use a stepping motor or a similar drive means which is capable of fme adjustments in inclination angle.

Upon tilting the front variable transmission plates 11a and 11b and the rear variable transmission plates 11c and 11d by turning the respective tilting shafts in the opposite directions as described above, incident light which comes in through the input aperture 10a is partly reflected off while traveling through the four variable transmission plates 11a to 11d. Namely, incident light is passed through the variable transmission plates 11 inversely depending upon the reflectivity of these plates. Since the variable light transmission plates 11 in the front and rear groups are turned through the same angle and in the opposite directions, the optical axis of the light path on the output side can be aligned exactly with that on the input side. Besides, in order to prevent secondary light reflections from interfering with output light, it is preferable for the variable transmission plates 11a to 11d to have an inclined non-parallel surface on one side thereof, for example, on the side of the output aperture 10b.

Figure 3:
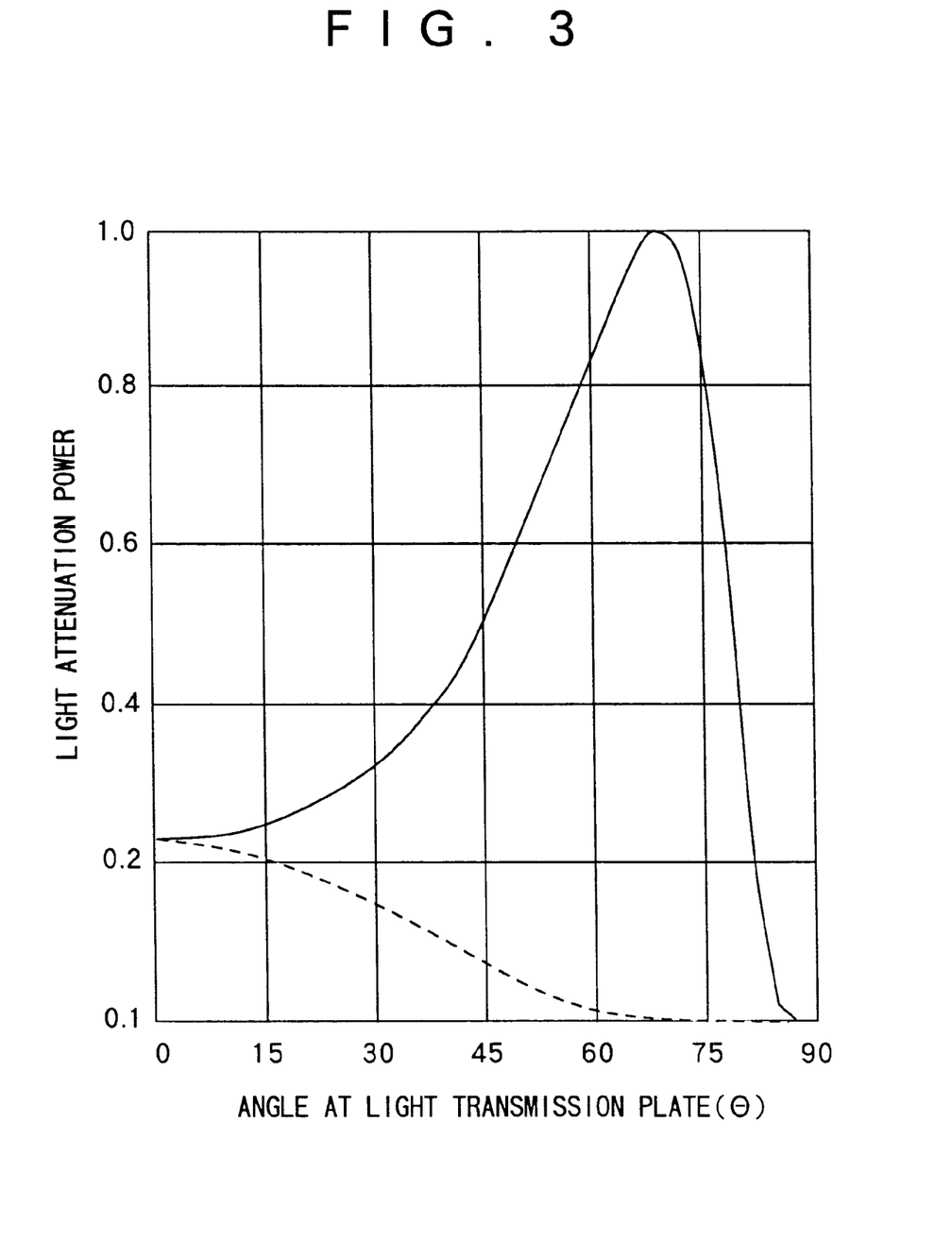
FIG. 3 is a diagram showing laser power attenuation characteristics of the light attenuation means in relation with inclination angles of variable light transmission plate members.

In this instance, the laser light from the light source 1 consists of a linearly polarized light component which is polarized in one direction. The diagram of FIG. 3 shows light attenuation characteristics of the attenuation means 5 in relation with the direction of inclination of the variable transmission plates 11a to 11d and the plane of polarization of laser light. In this diagram, a solid line indicates the light attenuation characteristics of the variable transmission plates 11 which are inclined through an angle θ about a rotational axis $A_1$ which is disposed perpendicularly to a plane of polarization P of the laser beam from the light source 1, while a broken line indicates the light attenuation characteristics of the variable transmission plates 11 which are inclined through an angle θ about a rotational axis $A_2$ which is disposed parallel with a plane of polarization P of the laser beam. Utilizing these light attenuation characteristics, the front and rear variable transmission plates 11a to 11d should be turned about the rotational shaft $A_1$ when the power of the laser beam from the light source 1 needs to be attenuated to a large extent, and should be turned about the rotational shaft $A_2$ when it becomes necessary to control the laser power in fine levels.

Therefore, a couple of light attenuation means 5 are provided in order to permit both large and fine attenuations in controlling the power of the laser beam from the light source 1. For this purpose, the variable transmission plates 11 of the light attenuation means in the first stage, which is located on the side of the laser light source 1, are arranged to turn about the rotational axis $A_1$, while the variable transmission plates 11 of the light attenuation means of the second stage are arranged to turn about the rotational axis $A_2$. Preferably, the variable transmission plates 11 of the light attenuation means of the first stage are fixedly retained in a predetermined inclined position, and the light attenuation means of the second stage is rotatable continuously or step by step in a fine pitch for fine adjustments of the output laser power and at the same time for preventing fluctuations in the output power by feedback control, sampling and feeding back the output power for fme adjustments of the inclination angle of the variable light transmission plates in the second stage.

In addition, for finely controlling the laser output power more accurately and in a more stabilized manner, the optical laser pulse irradiation system is further provided with an output power detector which is constituted by a beam sampler 13 and a photodetector 14 as shown in FIG. 1. Connected to the beam irradiator is a controller 15 which controls the stepping motor or other drive means to tilt the variable transmission plates 11a to 11d in a direction of stabilizing the output power according to signals from the output power detector. Consequently, the output power of the light attenuation means 5 is constantly adjusted to produce a laser beam of an optimum power level in a stabilized state.

In the manner as described above, the laser beam from the light source 1 is converted into pulses of an optimum intensity level for forming bumps on the surface of the glass disk 2 or a substrate of a magnetic recording disk. The laser beam is then converted into an annular beam of a collimated light flux through the annular beam expander 6 and irradiated on a predetermined position on the disk substrate 2.

Figure 5:
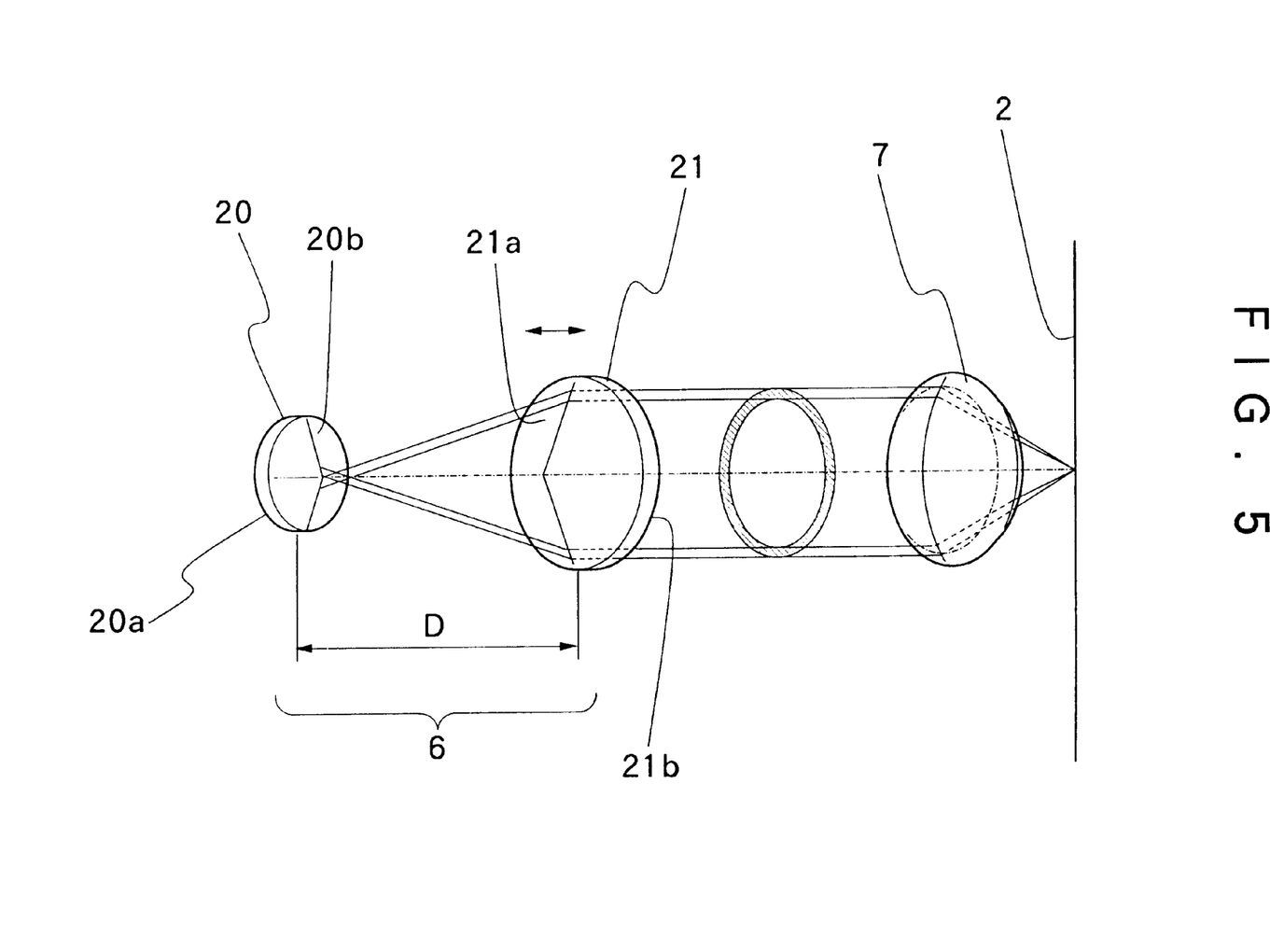
FIG. 5 is a schematic view of an annular aperture beam expander.

Shown in FIG. 5 is the construction of the annular beam expander 6. As seen in this figure, the beam expander 6 is constituted by a couple of cone lenses 20 and 21. The first cone lens 20 has a flat planar surface 20a on the input side and a conical surface 20b on the output side thereof, while the second cone lens 21 has a conical surface 21a on the input side and a flat planar surface 21b on the output side thereof. Of the two cone lenses which are located in the path of the laser beam, the first cone lens 20 is located spacedly on the front side of the second cone lens 21 which is larger in diameter than the first cone lens 20. When arranged in this manner, a parallel light flux which is incident on the flat surface 20a of the first cone lens 20 comes out of the conical surface 20b in the form of an annular beam having expanded inner and outer diameters according to the distance between the first and second cone lenses 20 and 21. The light rays are collimated into a parallel flux upon passage through the second cone lens 21. Similarly to the variable transmission plates 11 of the light attenuation means 5, the first and second cone lenses 20 and 21 are formed of ZnSe to ensure passage of a wavelength of 10.6 μm alone. The same applies to the lenses of the objective optical system 7.

Using the annular beam expander 6 which are constituted by a couple of cone lenses 20 and 21 as described above, the beam diameter to be condensed toward the surface of the disk substrate 2 by the objective optical system 7 can be controlled arbitrarily by shifting the position of the second cone lens 21 toward or away from the first cone lens 20 as indicated by arrows in FIG. 5 to vary the distance between the two cone lenses 20 and 21. Alternatively, the inner and outer diameters of the beam can also be varied by changing the apex angles of the two cone lenses 20 and 21.

Figure 6:
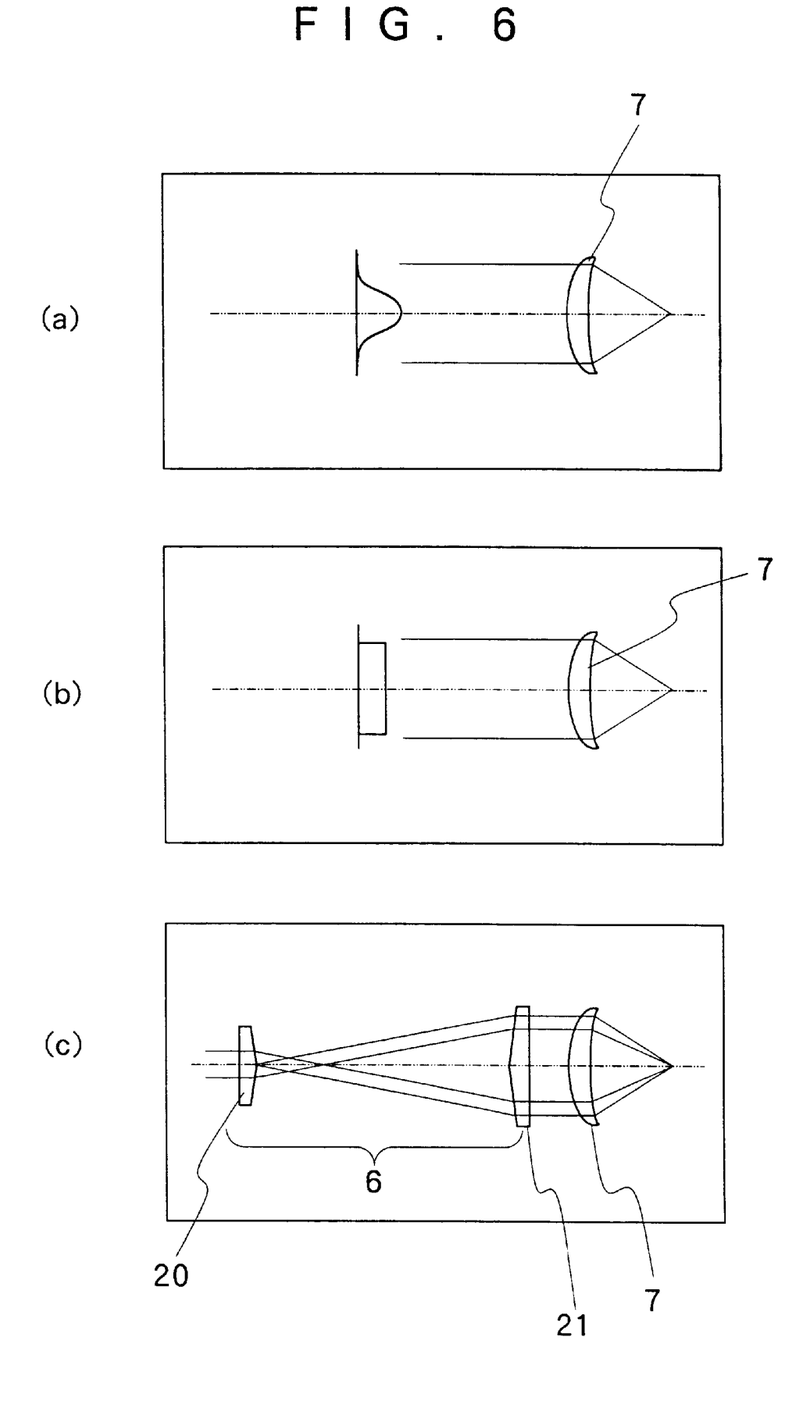
Figure 7A:
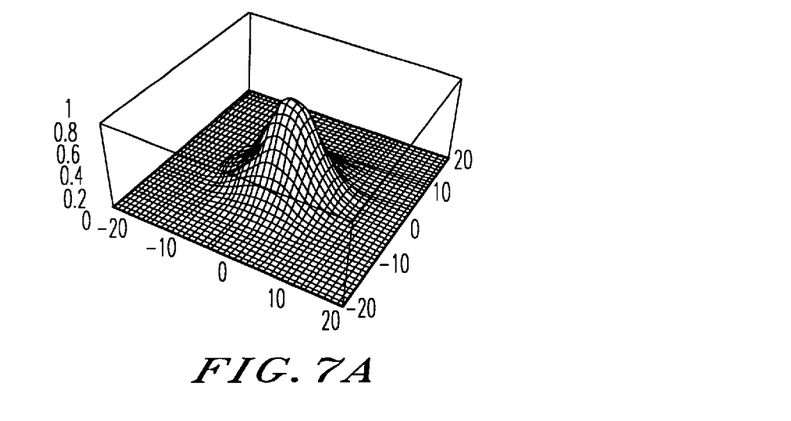
Figure 7B:
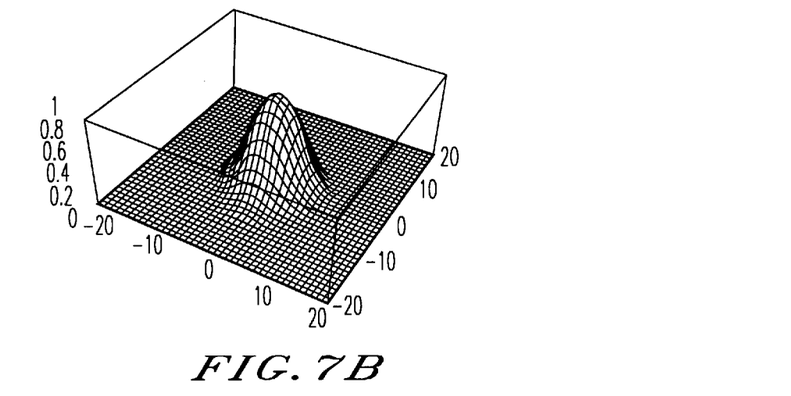
Figure 7C:
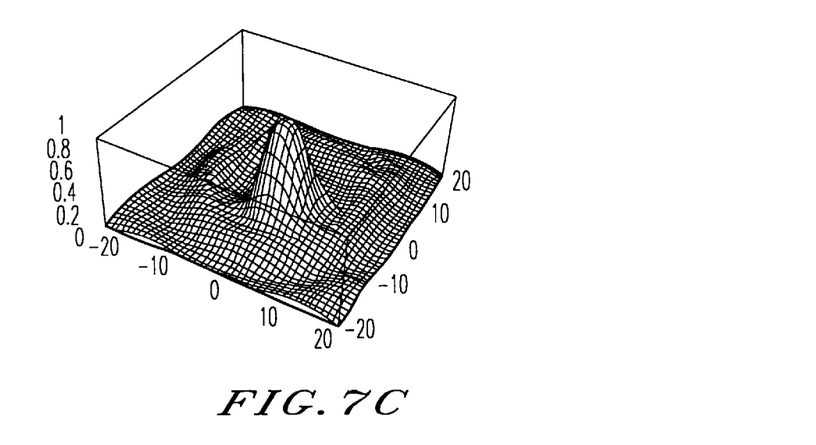

Generally, in converging a laser beam toward a predetermined position by the use of an objective optical system, the light beam incident on the objective optical system has a Gaussian profile as indicated at (a) of FIG. 6 or in the form of a collimated light flux as indicated at (b) of the same figure. However, when passed through the annular beam expander 6, the incident light on the objective optical system 7 takes the shape of an annular beam as indicated at (c) of FIG. 6. When the objective optical system 7 is used, the incident light beams (a), (b) and (c) of FIG. 6 are condensed toward a predetermined position in the patterns as shown at (a), (b) and (c) of FIG. 7, respectively. Upon comparing the beam pattern (c) with the beam patterns (a) and (b), it will be seen that the beam pattern (c) is the smallest in diameter. However, diffraction light components appear conspicuously in the beam pattern (c) of FIG. 7.

Generally speaking, the beam can be converged to a smaller diameter by passing high spatial frequency components alone. In a light beam incident on a lens, the light components passing through peripheral portions of the lens have higher spatial frequencies as compared with light components passing through center portions of the lens. This means that, by making the incident light beam into an annular shape through the annular beam expander 6, the effects of reducing the beam diameter can be enhanced conspicuously. Especially, the results obtained by the use of the annular beam expander are quite different from an ordinary beam expander which expands a beam in a solid circular form. Namely, in case a beam is expanded into a collimated light flux of the same diameter by the use of an annular beam expander, it becomes possible to reduce low frequency components in proportion to the inner diameter of the annular beam, that is to say, to increase the spatial frequency as a whole. Accordingly, the beam can be condensed to a smaller spot diameter by the objective optical system 7.

Figure 8A:
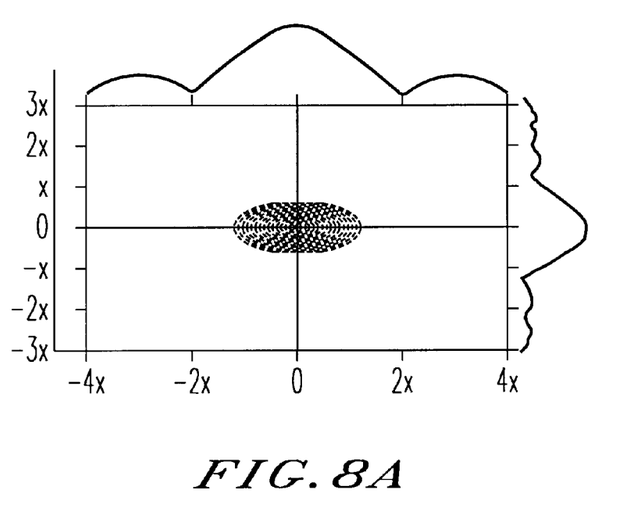
FIGS. 8(a) and 8(b) diagrammatically shows light amplitude distributions which occur at the focus of the objective optical system when an ordinary beam expander and an annular aperture beam expander are used.
Figure 8B:
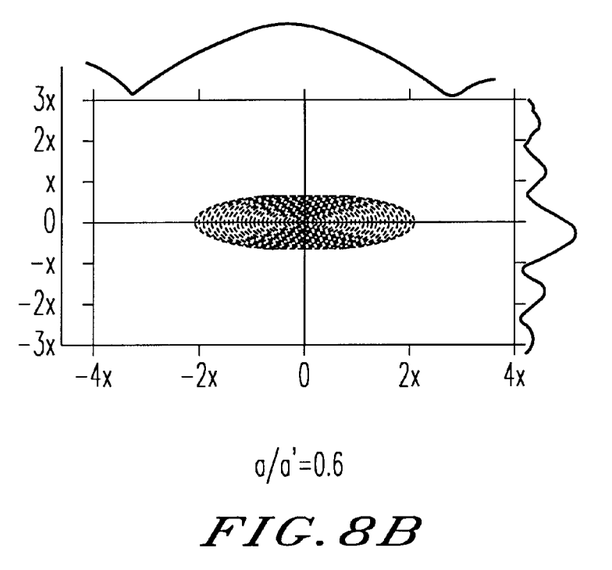

In this regard, the present inventors conducted experiments in an attempt to ascertain light amplitude distribution in the vicinity of the focal point of the objective optical system 7 with regard to a round beam expanded and collimated through an ordinary beam expander and an annular beam formed by the annular beam expander 6. The results are shown in FIG. 8 in which indicated at (a) is a round beam formed by an ordinary beam expander and at (b) is an annular beam formed by the annular beam expander 6. In this instance, the outer diameter a' of the annular beam was same as that of the round beam in (a), and the ratio of the inner diameter to the outer diameter a was adjusted to be a/a'=0.6. The center position in each one of the graphs (a) and (b) represents a geometrical focal point. The waveforms on the upper side indicate light amplitude in a plane perpendicular to the optical axis, while the waveforms on the right side indicate light amplitude on the optical axis. Of these two waveforms in each graph, the amplitude of the upper-side waveform indicates the depth of focus, and the right-side waveform indicates the radius of the converged beam spot. Upon comparing the two cases (a) and (b) of FIG. 8, it will be seen that a greater focal depth and a smaller beam spot diameter can be obtained in (b).

However, in (b) of FIG. 8, the waveform is more influenced by diffraction than in (a). Nevertheless, when a laser beam is irradiated on a glass substrate, such diffraction has no influence on the formation of bumps because it is the laser power at or in the vicinity of a peak value which contributes to the formation of bumps. Therefore, bumps are formed in a smaller diameter in (b) than in (a). The diameter of the condensed beam spot which determines the bump diameter can be controlled by varying the distance between the first and second cone lenses 20 and 21 of the annular beam expander 6 as mentioned hereinbefore. Accordingly, the diameter of bumps to be formed on the disk substrate 2 can be finely controlled by way of the annular beam expander 6. Besides, since the annular beam expander 6 has a greater focal depth, it also contributes to make easier the assembling work of the optical system of the laser pulse irradiator as a whole.

Figure 9:
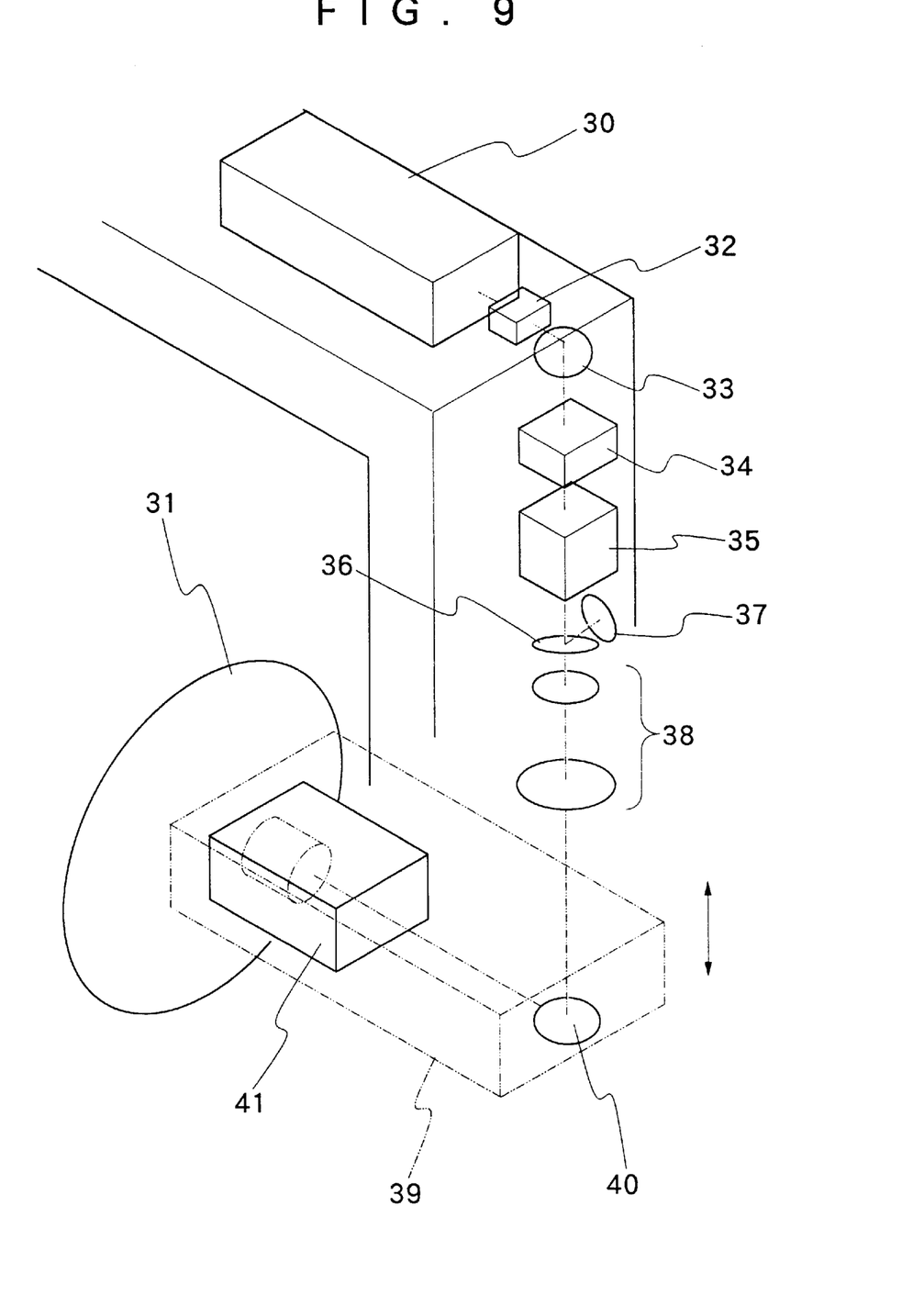
FIG. 9 is a schematic view of an exemplary arrangement of objective optical system suitable for use on the disk texturing apparatus according to the present invention.

Referring to FIG. 9, there is shown by way of example the general layout of a laser texturing machine. In this figure, indicated at 30 is a laser light source, at 31 is a glass substrate of a magnetic recording disk to be textured. The laser light source 30 is a $CO_2$ laser which is adapted to emit a continuous laser beam and provided with an electromagnetic shutter thereby to control the start and stop of laser beam emission from the laser light source 30.

Figure 4:
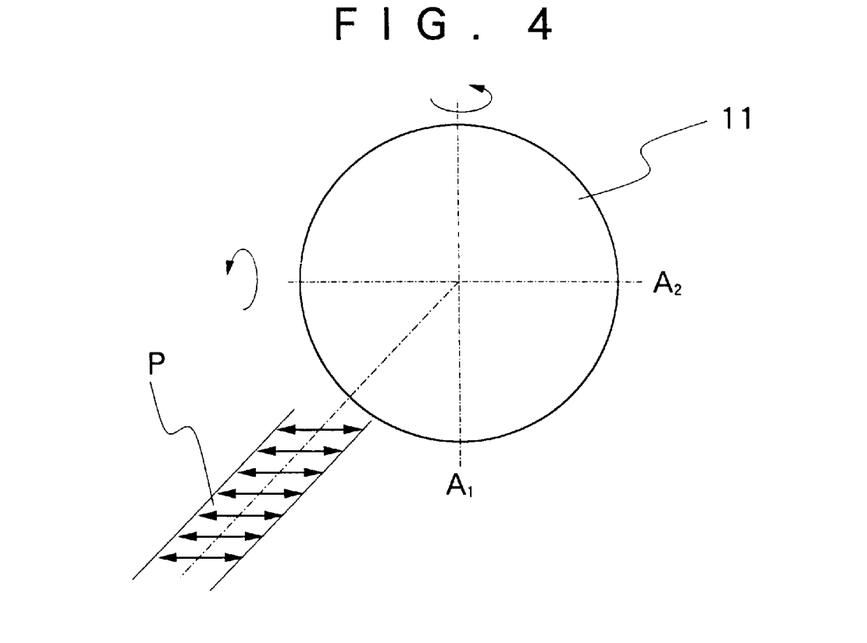
FIG. 4 is a diagram showing relations between laser power attenuation characteristics and directions of variable light transmission plate members.

Designated at 32 is a first light attenuation means which serves to adjust the laser beam power from the laser light source 30. This first light attenuation means is arranged substantially in the same manner as the light attenuation means 5 shown in FIG. 2. In controlling the intensity of the laser beam from the laser light source 40, the variable transmission plates of the first light attenuation means 32 are arranged to turn about the rotational axis A1 which is disposed perpendicularly to the plane of polarization P of the laser beam as shown in FIG. 4. Thus, the first light attenuation means 32 operates on the control characteristics indicated by the solid line in FIG. 3, roughly controlling the power level of the laser beam.

The laser beam which has been attenuated approximately to an aimed power level is then reflected by an isolation mirror 33 to turn the light path in the downward direction. The isolation mirror 33 is arranged to have 100% reflectivity for polarized light components traveling in the direction of polarization of the laser beam emitted from the laser light source 30 but to have almost complete absorptivity for light components polarized at right angles with the plane of polarization of the laser beam. The direction of polarization of return light, which occurs as a result of light reflections off the surface of the disk substrate 31, is polarized at right angles with the plane of polarization of the incident laser beam by a polarizing mirror, which will be described hereinlater, so that it can be almost entirely absorbed by the isolation mirror 33 instead of returning in a direction toward the laser light source 30. This makes it possible to prevent the output laser beam of the laser light source 30 from being fluctuated under the influence of return light.

The continuous wave laser beam reflected off the isolation mirror 33 is then converted into pulses having predetermined width and intervals at a pulsed wave generator 34. For example, the pulsed wave generator 34 is constituted by an AOM element or the like. Bumps can be formed on the surface of the disk substrate in a specified density by setting suitable pulse periods and intervals in converting the laser beam into pulses at the pulsed wave generator 34.

Indicated at 35 is a second light attenuation means which is arranged substantially in the same manner as the first light attenuation means 32 except that the tilting direction of its variable transmission plates is shifted by 90 degrees from that of the first attenuation means. Therefore, the second light attenuation means operates according to the light attenuation characteristics as indicated by the broken line in FIG. 3. As seen in that figure, the broken-line attenuation characteristics draw a gradual curve which permits fme adjustments of the laser power more steadily in terms of controllability. In contrast to the first light attenuation means 32 which is fixed to certain light attenuation characteristics as a fixed control means, the second light attenuation means 35 provides a variable control on the laser power. The second light attenuation means 35 operates to keep the laser power at a predetermined constant level by monitoring the output power and, if a change in output power is detected, adjusting the inclination angle of the variable transmission plates in such a direction as to offset the change in output power level. For this purpose, a beam sampler 36 is provided on the output side of the second light attenuation means 35 thereby to sample the output laser power. More specifically, by the beam sampler 36, about 8% of the output laser beam is reflected toward a high-power detector 37 for sampling purposes. When a change in the output power level is detected by the high-power detector 37, a stepping motor or other drive means is actuated to control the inclination angle of the variable transmission plates of the second light attenuation means 35, not shown, turning the variable light transmission plates through an angle which offsets a deviation from the predetermined power level.

The laser pulses, which have been adjusted to a predetermined power level, are converted into an annular beam and at the same time formed into a collimated light flux through the annular beam expander 38. Having the construction and functions as described hereinbefore, this annular beam expander 38 controls the diameter of the bumps to be formed on the disk substrate 31, by means of a couple of cone lenses having predetermined apex angles and being positioned with a predetermined spacing therebetween.

The annular beam from the annular beam expander 38 is taken into the objective optical system 39. In this particular example, the objective optical system 39 is constituted by a polarizing reflector mirror 40 and an objective lens system 41. This objective optical system 39 is movable vertically in the direction of the optical axis. By shifting the position of the objective optical system 30 in the direction of the optical axis as indicated by an arrow, the laser pulse bombarding position on the face of the disk substrate 31 can be shifted in the radial direction to form a CSS zone of a predetermined width around the inner periphery of the disk 31. Since the output light beam from the annular beam expander 38 is in the form of a collimated light flux, the object focal point remains unchanged even if the spacing between the objective lens system 41 and the annular beam expander 38 is changed.

The polarizing reflector mirror 40 is provided on the objective optical system 39 for the purpose of turning the light path at right angles and for arranging the objective optical system in a compact form. Besides, the polarizing reflector mirror 40 is arranged to polarize return light from the surface of the disk substrate 31 at right angles with the plane of polarization of incident light so that the return light is absorbed by the isolation mirror 33.

The objective lens system 41 includes an autofocusing mechanism. Since the annular beam from the annular beam expander 38 has a larger focal depth, laser pulses can be more accurately focused on the disk substrate 31 by the objective lens system 41. In addition, even if a deviation occurs to the spacing between the objective optical system 41 and the disk substrate 31 during a texturing operation, it can be corrected by the autofocusing mechanism to converge the laser pulses to a minimum spot diameter accurately on the surface of the disk substrate 31.

By the arrangements as described above, a laser beam from the laser light source 30 is converted into a pulsed wave, and then condensed to a specified beam spot on the disk substrate 41 through the objective lens system 41 after adjustments of power level and beam pattern to form minute bumps of desired dimensions on a CSS zone in a delimited surface area on the disk substrate 31. The disk substrate 31 is mounted on a spindle, and while the disk substrate 31 is rotated together with the spindle, laser pulses are successively fired at the surface of the disk substrate 31 from the objective optical unit 39 which is being moved in the radial direction of the disk substrate 31. Start and stop positions of a texturing operation can be controlled by opening and closing the electromagnetic shutter of the laser light source 30 to form a textured CSS zone in a specified width and in a specified position with extremely high accuracy.

The accuracy of a texturing operation can be assessed by the degree of uniformity in bump shape and density. Particularly, considering the construction and the material of magnetic heads in general, the curvature of bump apexes is an important factor in securing smooth and speedy CSS motions of magnetic heads. In order to control the bump apex curvature, it is necessary to control the beam spot diameter of laser pulses at the focus of the objective lens system 41. In this regard, the use of the annular beam expander 38 makes it possible to control the beam spot diameter regardless of the output wavelength of the laser light source in a texturing operation, that is to say, to form bumps in a shape which will guarantee optimum CSS motion characteristics of magnetic heads.

Although the texturing machine in the above-described embodiment employs the laser light source 30 with particular output characteristics, the output laser power can be finely adjusted by means of the two light attenuation means 32 and 35. In addition, generation of optimum laser pulses at the pulsed wave generator 34 and fme adjustments of the beam spot diameter at the focus of the objective lens system 41 through the annular beam expander 38 make it possible to perform texturing operations of extremely high precision.

The above-described embodiment shows a texturing machine which is arranged to machine one side of a magnetic disk substrate at one time. However, needless to say, it can be modified to texture both sides of a disk substrate simultaneously. For dual side texturing, for example, the texturing machine may employ a beam splitter which is located in place of the isolation mirror 33 or which is located in position in the light path of the laser beam between the beam sampler 36 and the annular beam expander 38, thereby splitting and transferring the laser beam to a couple of objective lens systems facing the opposite sides of a magnetic disk substrate. In texturing operations, disk substrates may be rotated in a horizontal position, but it is preferable to retain disk substrates in a vertical or upright position to preclude the possibilities of deposition of foreign matter on disk faces. Especially, troubles of this sort can be completely precluded by locating disk substrates in a downflow of clean air. Alternatively, a disk texturing line may include a disk washer thereby to scrub disk substrates in a stage subsequent to a texturing operation.

What is claimed is:

1. In a laser apparatus for texturing a specific surface area of a rotating magnetic recording disk substrate radially over a predetermined width by irradiation of laser pulses supplied from a laser light source and successively fired at said disk surface through a laser pulse irradiating optical system in movement in a radial direction relative to said disk substrate, said laser pulse irradiating optical system comprises:

an annular aperture beam expander for forming a laser beam from said laser light source into an annular beam of collimated light flux having specified inner and outer diameters; and an objective optical system for converging said annular beam of collimated light flux from said annular beam expander on a surface of a magnetic recording disk substrate.

2. A laser texturing apparatus as defined in claim 1, wherein said laser light source is a $CO_2$ laser.

3. A laser texturing apparatus as defined in claim 1, wherein said annular aperture beam expander is constituted by a first cone lens and a second cone lens located in a light path with a spacing therebetween, said first cone lens having a flat planar surface on the input side and a conical surface on the output side thereof, and said second cone lens having a conical surface on the input side and a flat planar surface on the output side thereof.

4. A laser texturing apparatus as defined in claim 3, wherein said first and second conical lenses of said annular beam expander are relatively movable toward and away from each other for adjusting said spacing.

5. A laser texturing apparatus as defined in claim 1, wherein said objective optical system is movable in the direction of the optical axis relative to said annular beam expander.

6. A laser texturing apparatus as defined in claim 5, wherein said objective optical system includes a polarized reflector mirror for turning a light path of said annular beam from said annular beam expander at right angles toward an objective(optical)lens system, said objective optical system being movable in a radial direction of said magnetic recording disk substrate along with said polarized reflector mirror.

7. A laser texturing apparatus as defined in claim 1, further comprising a light attenuation means located on the light input side of said annular aperture beam expander for adjusting power level of said laser beam from said laser light source.

8. A laser texturing apparatus as defined in claim 7, wherein said light attenuation means is constituted by a number of variable light transmission plates located in a light path to said annular beam expander, said variable light transmission plates being tiltable into angular positions relative to optical axis to vary light attenuation characteristics.

9. A laser texturing apparatus as defined in claim 8, wherein said light attenuation means is constituted by two sets of variable light transmission plates located in the path of said laser beam with a predetermined spacing therebetween, each variable light transmission plate in each set being tiltable in the opposite direction relative to a variable light transmission plate in the other set.

10. A laser texturing apparatus as defined in claim 9, wherein each set of variable light transmission plate consists of one or two light attenuator plates.

11. A laser texturing apparatus as defined in claim 8, wherein each one of said variable light transmission plates of said light attenuation means is constituted by a light transmitting plate having non-parallel planar surfaces on the input and output sides thereof.

12. A laser texturing apparatus as defined in claim 8, wherein said light attenuation means is constituted by a first light attenuation means located in a position closer to said laser light source, and a second light attenuation means located in a position closer to a light emitting side of said laser pulse irradiating optical system, variable light transmitting plates of said first light attenuation means being tiltable in a direction 90° shifted relative to a tilting direction of variable light transmitting plates of said second light attenuation means.

13. A laser texturing apparatus as defined in claim 12, wherein variable light transmitting plates of said first light attenuation means are tiltable in a direction in which a large amount of light attenuation takes place, while variable light transmitting plates of said second light attenuation means are tiltable in a direction in which only a small amount of light attenuation takes place.

14. A laser texturing apparatus as defined in claim 13, further comprising means for sampling output light intensity of said second light attenuation means and controlling the angle of inclination of said variable light transmitting plates in a direction of offsetting variations in said output light intensity to maintain a constant output level.

15. A method for laser-texturing a magnetic recording disk substrate by successively bombarding laser pulses on the face of a rotating disk substrate from an optical laser pulse irradiating means in movement in a radial direction relative to said disk substrate to form a textured zone radially over a predetermined width on the face of said disk substrate, said method comprising the steps of:

adjusting the intensity of a pulsed laser beam from a laser light source to an optimum level for an aimed bump diameter;

converting said laser beam into an annular beam of a collimated light flux having specified inner and outer diameters; and irradiating resulting laser pulses on a surface of said disk substrate through an objective optical system and condensing said laser pulses into a specified spot diameter thereby to form minute bumps of predetermined shape and diameter uniformly on said surface of said disk substrate.

* * * * *